United States Patent [19]
Ryan

[11] Patent Number: 5,216,891
[45] Date of Patent: Jun. 8, 1993

[54] SOLUTION FLOWS IN DIRECT EXPANSION LITHIUM BROMIDE AIR CONDITIONER/HEATER

[75] Inventor: William A. Ryan, Chicago, Ill.

[73] Assignee: Gas Research Institute, Chicago, Ill.

[21] Appl. No.: 904,205

[22] Filed: Jun. 25, 1992

[51] Int. Cl.$^5$ .............................. F25B 15/00
[52] U.S. Cl. ........................ 62/101; 62/476; 62/324.2
[58] Field of Search ............ 62/476, 101, 324.2, 62/141, 483, 484, 485, 103, 489

[56] References Cited

U.S. PATENT DOCUMENTS

| | | | |
|---|---|---|---|
| 3,555,839 | 1/1971 | Leonard, Jr. ............ | 62/101 |
| 4,178,989 | 12/1979 | Takeshita et al. ....... | 165/62 |
| 4,312,476 | 1/1982 | Pohlmann ............... | 237/2 B |
| 4,314,668 | 2/1982 | Jansen et al. ........... | 237/2 B |

Primary Examiner—Albert J. Makay
Assistant Examiner—William C. Doerrler
Attorney, Agent, or Firm—Speckman, Pauley & Fejer

[57] ABSTRACT

A process and apparatus for heating in an absorption cooling and heating system in which a refrigerant vapor and a concentrated absorbent solution are generated in a generator, the refrigerant vapor is condensed in an evaporator functioning as a condenser to form a condensed refrigerant, the condensed refrigerant is mixed with concentrated absorbent solution in the evaporator producing a dilute absorbent solution, the dilute absorbent solution is cooled, and the cooled dilute absorbent solution is circulated from the evaporator back to the generator.

14 Claims, 2 Drawing Sheets

SOLUTION FLOWS IN DIRECT EXPANSION LITHIUM BROMIDE AIR CONDITIONER/HEATER

BACKGROUND OF THE INVENTION

1. Field Of The Invention

This invention relates to a gas fired absorption air cooling and heating system which provides a simplified process and apparatus for both cooling and heating, in particular, a gas fired absorption process and apparatus in which the absorber, outdoor coil and condenser are shunted out of the system in a heating mode of operation.

2. Description of the Prior Art

Absorption cooling systems are well established in the prior art. In such systems, refrigerant vapor is absorbed in an absorber. The resulting absorbent-refrigerant solution is circulated to a generator in which it is heated. The refrigerant is separated from the absorbent-refrigerant solution and condensed, after which it is recycled to an evaporator in which it is vaporized to be reabsorbed in the absorber and begin the cycle again.

Lithium bromide absorption air conditioner/heaters have been applied in the past to small commercial and residential applications. In these low capacity applications, the refrigerant, which is water, is boiled in an evaporator. The evaporator, in the form of a coil, provides the cooling for the supply air directly. The coil consists of a bank of tubes through which the water, at very low pressures, from about 6 to about 9 millimeters of water column absolute, is flowing. The water boils and delivers a cooling effect to an air stream which flows on the outside of the tube bank. The outside surface of these tubes is generally finned in order to promote heat transfer from the air stream.

In order to allow these systems to provide heating through the cooling cycle, two known systems can be used. In the first system, the evaporator serves as an absorber, with the heat of absorption being rejected to the air stream of spatial air flowing around the coils of the evaporator. However, to make an evaporator operate in this manner is technically cumbersome. A simpler approach is to eliminate the condenser from the cycle and pass refrigerant vapor directly from the generator to the coil. In this case, the refrigerant vapor, preferably water vapor, condenses in the evaporator and is then returned to the generator. In effect, the evaporator is used for "steam heating" and the heating effect is not sensitive to the configuration of the coil in the evaporator.

However, one disadvantage of this steam heating cycle is that any pump in the absorption system must handle any output of the evaporator as well as the dilute absorbent solution returning from the absorber, both of which are mixed together before passing through the pump. During a cooling mode of operation, the solution in the pump will be fairly cool. However, in a heating mode of operation, a steam heating cycle produces a significant amount of condensed refrigerant exiting the evaporator. Thus, absorbent solution passing through the absorber will not be diluted, but rather will mix with the refrigerant condensate in the pump which mixing results in the release of a significant amount of heat due to the heat of solution, producing a hot dilute absorbent solution which can adversely affect pump life.

Also of concern is the efficiency of such a system. The heat of solution liberated when the concentrated absorbent solution and the refrigerant condensate are mixed is heat which is returned to the generator. Mixing these solutions in the pump and returning the resulting hot solution to the generator may increase jacket losses and decrease the overall efficiency of the system in the heating mode of operation. Even if insulation is properly applied to prevent such jacket losses, the dilute absorbent solution returned to the generator will be hotter than usual, thereby increasing overall generator temperatures. The increased generator temperatures result in a reduction in heat transfer from the burner in the generator and, thus, the overall efficiency of the system is reduced. In addition, higher generator temperatures tend to significantly increase corrosion rates within the system.

U.S. Pat. No. 4,178,989 teaches a solar powered lithium bromide absorption cooling/heating system in which the refrigerant is used as the heating medium for the heating cycle, bypassing the absorber and undergoing condensation in the heat exchanger between the condenser and the absorber. This patent teaches separation of the refrigerant from the solvent and storage of the solvent in an absorber and reservoir which is bypassed in the heating mode while the refrigerant may be stored in a separate reservoir interposed between the condenser and the expansion valve.

SUMMARY OF THE INVENTION

It is an object of this invention to provide a process and apparatus for heating in an absorption cooling and heating system in which heating is provided through the cooling portion of the absorption cooling and heating system.

It is another object of this invention to provide a process and apparatus for heating in an absorption cooling and heating system in which the evaporator of the cooling system functions as a condenser.

It is yet another object of this invention to provide a process and apparatus for heating in an absorption cooling and heating system which is simplified for both cooling and heating.

It is another object of this invention to provide a process for heating in an absorption heating and cooling system in which mixing of the concentrated absorbent solution and condensed refrigerant in the pump of the system is avoided.

It is yet another object of this invention to provide a process for heating in an absorption cooling and heating system which provides for extended pump life.

It is yet another object of this invention to provide a process and apparatus for heating in an absorption cooling and heating system in which the efficiency of the heating cycle is increased.

It is yet another object of this invention to provide a process and apparatus for heating in an absorption cooling and heating system which can be easily retrofitted onto existing absorption cooling and heating systems.

These and other objects are achieved in accordance with a process for heating in an absorption cooling and heating system in accordance with one embodiment of this invention in which a refrigerant vapor and a concentrated absorbent solution are generated in a generator, the refrigerant vapor is condensed in an evaporator in the cooling system, the condensed refrigerant is mixed with concentrated absorbent solution in the evaporator producing a dilute absorbent solution, the dilute absorbent solution is cooled, and the cooled dilute absorbent solution is circulated from the evaporator back to the generator. More specifically, refrigerant vapor generated in the generator of the absorption cooling and heating system is fed to the upper portion of the evaporator of the absorption cooling and heating system, bypassing the condenser of the system, and condensing in the evaporator. The condensed refrigerant flows through the evaporator into the lower portion thereof wherein it mixes with concentrated absorbent solution from the generator, forming a dilute absorbent solution. The heat of solution generated by the mixing of the condensed refrigerant and the concentrated absorbent solution is removed by supply air to be heated flowing through the evaporator. The resulting cooled dilute absorbent solution is subsequently conveyed to a heat exchanger in which it is heated in a heat exchange relationship with concentrated absorbent solution from the generator.

In a preferred embodiment of this invention, the generator is heated by natural gas.

In accordance with another embodiment of this invention, a first portion of cooled dilute absorbent solution is heated in a low stage heat exchanger in heat exchange relationship with a first portion of concentrated absorbent solution and a second portion of cooled dilute absorbent solution is heated in a high stage heat exchanger in heat exchange relationship with a second portion of concentrated absorbent solution. The first portion of dilute absorbent solution is subsequently circulated to a low pressure generator and the second portion of dilute absorbent solution is circulated to a high pressure generator. The high pressure generator, in turn, generates a liquid refrigerant which mixes with refrigerant vapor from the low pressure generator, which mixture is subsequently introduced into the upper portion of the evaporator.

In accordance with the process of this invention, the outdoor coil, condenser, and absorber of the absorption cooling and heating system are shunted out of the system because these components are not required for operation of the process of this invention.

An apparatus for absorption cooling and heating in accordance with one embodiment of this invention comprises generator means for generating a concentrated absorbent solution, a condenser in communication with said generator means, an evaporator in communication with said condenser, an absorber in communication with the evaporator, a heat exchanger in communication with the absorber and the generator, means for pumping a dilute absorbent solution from the absorber to the generator, means for removing heat from the condenser and the absorber, and means for selectively directing the concentrated absorbent solution generated in the generator means between an input of the absorber and a lower portion of the evaporator.

In accordance with one embodiment of the apparatus of this invention, the means for selectively directing the concentrated absorbent solution generated in the generator means between an input of the absorber and a lower portion of the evaporator comprises a valve disposed between the heat exchanger and absorber, the valve being in communication with the heat exchanger, the absorber and the evaporator.

The apparatus in accordance with one embodiment of this invention further comprises means for interrupting a hydronic cooling flow to the condenser and the absorber when the apparatus is in a heating mode.

In accordance with another embodiment of the apparatus of this invention, the generator means comprises at least one double effect generator.

BRIEF DESCRIPTION OF THE DRAWINGS

These and other features and advantages of this invention will be apparent from the detailed description of preferred embodiments in conjunction with the drawings wherein.

DESCRIPTION OF PREFERRED EMBODIMENTS

Figure 1:
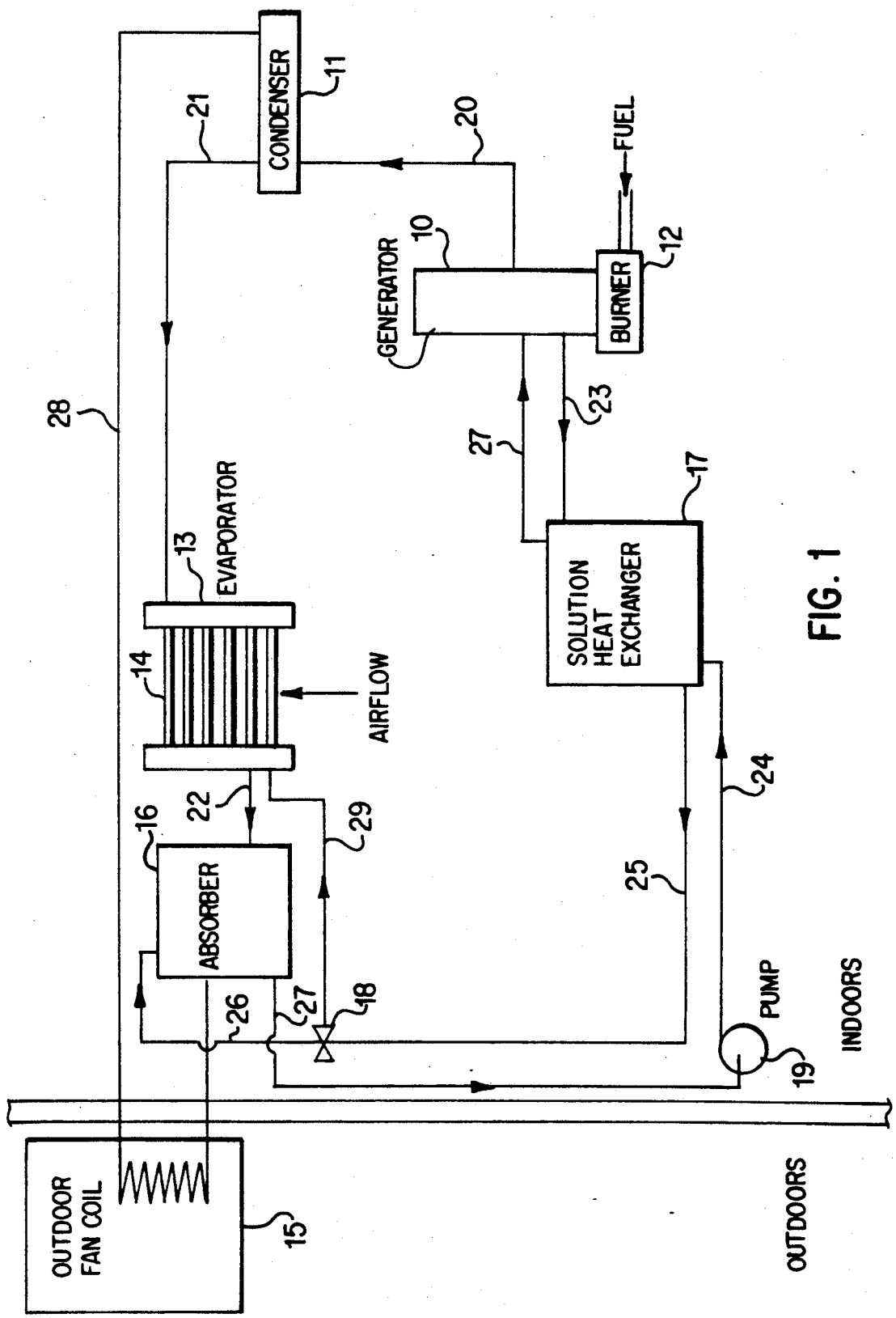
FIG. 1 is a schematic diagram of a single effect absorption air conditioner system in accordance with one embodiment of this invention.

FIG. 1 depicts a single effect absorption air conditioner system in accordance with one embodiment of this invention. It should be noted that although the absorption cooling and heating cycle of this invention is described in terms of lithium bromide-water as the preferred absorbent-refrigerant pair, in no way is the choice of absorbent-refrigerant pairs limited. For example, in addition to lithium bromide-water, water-ammonia, sulfuric acid-water, potassium hydroxide-water, and any absorbent-refrigerant pair that satisfies the functional requirements of prior ar absorption cycles may be used in the process and apparatus of this invention.

As used in the specification and claims hereof, concentrations of absorbent-refrigerant solution refer to relative concentrations of absorbent in the absorbent-refrigerant solution. Thus, increasing the concentration of the absorbent-refrigerant solution to produce a concentrated absorbent solution means that the ratio of the concentration of absorbent to the concentration of refrigerant in the absorbent-refrigerant solution has increased. Likewise, reducing the concentration of, or diluting, the absorbent-refrigerant solution, producing a dilute absorbent solution, means that the ratio of the concentration of absorbent to the concentration of refrigerant in the absorbent-refrigerant solution has decreased.

In accordance with one embodiment of the process of this invention, in a cooling mode of operation, a refrigerant vapor and a concentrated absorbent solution are generated in generator 10. Generator 10 is heated by energy released from the combustion of fuel by burner 12. In accordance with a preferred embodiment of this invention, the fuel used to heat generator 10 is natural gas. The refrigerant vapor generated by generator 10 exits generator 10 through process line 20 through which it flows into condenser 11. The refrigerant vapor, in heat exchange relationship with cooling water from outdoor fan coil 15, is condensed, producing liquid refrigerant which exits condenser 11 through liquid refrigerant process line 21. The liquid refrigerant flows through liquid refrigerant process line 21 into evaporator 13. Evaporator 13 comprises evaporator coils 14 which are in communication with liquid refrigerant process line 21, thus enabling liquid refrigerant from liquid refrigerant process line 21 to flow through evaporator coils 14. As liquid refrigerant flows through evaporator coils 14, spatial air to be cooled is blown through evaporator 13 in contact with evaporator coils 14. In this manner, heat exchanged between the spatial air flowing around evaporator coils 14 in evaporator 13 and liquid refrigerant within evaporator coils 14 occurs, cooling the spatial air and vaporizing the liquid refrigerant. The amount of heat transferred between the spatial air and the liquid refrigerant is approximately equal to the heat of vaporization of the refrigerant. The refrigerant vapor produced in evaporator 13 exits evaporator coils 14 through process line 22 through which it flows into absorber 16.

As previously indicated, in addition to refrigerant vapor, generator 10 produces a concentrated absorbent solution which exits generator 10 through process line 23. The heated, concentrated absorbent solution passes through process line 23 into heat exchanger 17 in which the concentrated absorbent solution gives up its heat to a dilute absorbent solution generated in absorber 16, which dilute absorbent solution is introduced into solution heat exchanger 17 through process line 24 in heat exchange relationship with the concentrated absorbent solution introduced into solution heat exchanger 17 through process line 23. The cooled concentrated absorbent solution exits solution heat exchanger 17 through process line 25 through which it flows through valve 18, process line 26 and into absorber 16. The concentrated absorbent solution absorbs the refrigerant introduced into absorber 16 through process line 22 producing a dilute absorbent solution which exits absorber 16 through process line 27, subsequently flowing through pump 19 and into process line 24. After passing through solution heat exchanger 17, the dilute absorbent solution exits solution heat exchanger 17 through process line 27. The dilute absorbent solution is introduced into generator 10 from process line 27, at which point the cycle is completed. The heat from burner 12 heats the dilute absorbent solution, producing a refrigerant vapor and a concentrated absorbent solution.

To provide the heat exchange required for condensing the refrigerant vapor in condenser 11, coolant from outdoor fan coil 15 is provided to condenser 11 through coolant line process 28.

The key feature of this invention is exemplified by operation of the system shown in FIG. 1 in a heating mode. In accordance with one embodiment of this invention, as in the cooling mode of operation, a refrigerant vapor and a concentrated absorbent solution are generated in generator 10. The refrigerant vapor exits generator 10 through refrigerant vapor process line 20 through which it flows as a vapor directly into evaporator 13, bypassing condenser 11. As a practical matter, as shown in FIG. 1, the refrigerant vapor flows through condenser 11, process line 21 and into evaporator 13. However, in the heating mode of operation, outdoor fan coil 15 is shunted out of the system rendering condenser 11 and absorber 16 inoperative. Thus, as refrigerant vapor from refrigerant vapor process line flows through condenser 11, it is not condensed as in the cooling mode, but rather remains in the vapor state. The refrigerant vapor is introduced preferably into the top portion of evaporator 13 which, in the heating mode of operation of the system, functions as a condenser. Thus, the refrigerant vapor is condensed as it flows through evaporator 13 in heat exchange relationship with spatial air to be heated flowing over and around coils 14 of evaporator 13.

As in the cooling mode of operation, concentrated absorbent solution from generator 10 flows through process line 23 into solution heat exchanger 17 and exits solution heat exchanger 17 through process line 25. Concentrated absorbent solution flows through process line 25 and into valve 18. In the heating mode of operation, valve 18 directs the flow of concentrated absorbent refrigerant through process line 29 into the bottom portion of evaporator 13 where it mixes with condensed refrigerant from the upper portion of evaporator 13, producing a dilute absorbent solution which exits evaporator 13 through process line 22. As in the cooling mode of operation, the dilute absorbent solution flows through process line 22 into absorber 16 and flows out of absorber 16 through process line 27. However, as with condenser 11, absorber 16 is shunted out of the system in the heating mode of operation and thus is inoperative. Accordingly, no absorption occurs within absorber 16 in the heating mode of operation. However, as in the cooling mode of operation, dilute absorbent solution exits absorber 16 through process line 27 from which it is pumped by pump 19 through process line 24 and into solution heat exchanger 17 in which it undergoes heat exchange with concentrated absorbent solution from generator 10.

In the process of this invention, the critical feature is the mixing of concentrated absorbent solution with condensed refrigerant within evaporator coils 14 of evaporator 13. Specifically, mixing occurs in the portions of evaporator coil 14 proximate the opening in evaporator 13 through which the dilute absorbent solution exits into process line 22, preferably at the bottom of evaporator 13. Thus, condensation of the refrigerant vapor entering evaporator 13 through liquid refrigerant process line 21 occurs preferably in the upper portion of evaporator 13 and mixing of the condensed refrigerant and the concentrated absorbent solution is carried out preferably in the bottom portion of evaporator 13. In this case the heat of solution generated by the mixing of condensed refrigerant and concentrated absorbent solution is transferred to spatial air flowing around evaporator coils 14, thereby maintaining the temperature of the resulting dilute absorbent solution passing through the pump and returning to the generator at an acceptably low level. Indeed, given the availability of proper heat transfer surfaces, the temperature of the dilute absorbent solution in the pump and introduced into the generator can be kept as low as desired. In addition, because the heat of solution, which is normally given up through losses elsewhere in the system as previously discussed, is transferred to the spatial air passing through evaporator 13, the efficiency of the heating cycle is increased, the life expectancy of the system is increased, and the cycle is simpler to operate.

EXAMPLE

Assume an evaporator coil operating at 140° F. in a lithium bromide/water absorption cooling and heating system having a 62% concentrated absorbent solution and a 58% dilute absorbent solution. The condensing refrigerant vapor provides 1,014 Btu's per pound of condensed refrigerant vapor to heat the occupied space.

Mixing of the condensed refrigerant with the absorbent in the evaporator in accordance with the process of this invention provides an additional 201 Btu's per pound of condensed refrigerant vapor. This, in turn, increases the heating capacity of the system by about 20% without additional fuel input.

Figure 2:
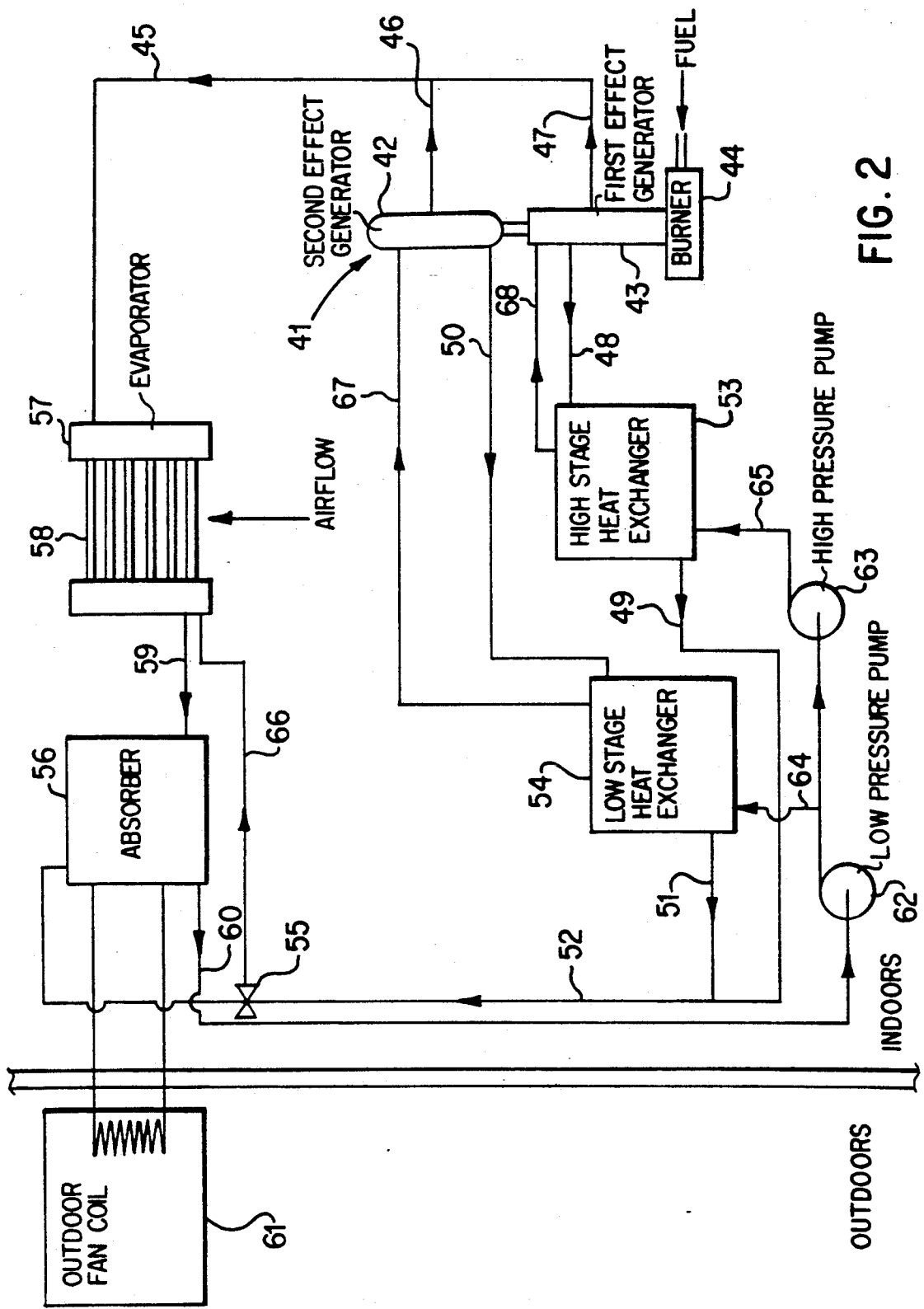
FIG. 2 is a schematic diagram of a double effect absorption air conditioner system in accordance with one embodiment of this invention.

It will be apparent to those skilled in the art that the process of this invention can be applied to a multiple effect absorption cooling and heating system having a direct expansion evaporator with similar results as the single effect air conditioner and heating system described hereinabove. FIG. 2 shows a double effect absorption cooling and heating system in accordance with one embodiment of this invention. In a double effect absorption system operating in a cooling mode, double effect generator 41 comprising second effect generator 42 and first effect generator 43 is heated by fuel burned in burner 44, generating refrigerant liquid which flows from second effect generator 42 through second effect generator process line 46 and first effect generator 43 through first effect generator process line 47 into process line 45. Also generated by double effect generator 41 are a high pressure stream of concentrated absorbent solution and a low pressure stream of concentrated absorbent solution. The high pressure concentrated absorbent solution exits first effect generator 43 through process line 48 from which it flows into high stage heat exchanger 53 and exits high stage heat exchanger 53 through process line 49. Similarly, low pressure concentrated absorbent solution exits second effect generator 42 through process line 50 from which it flows into low stage heat exchanger 54 and exits low stage heat exchanger 54 through process line 51. Both streams of concentrated absorbent solution then flow into process line 52, through valve 55 and into absorber 56. At the same time, the liquid refrigerant flowing through process line 45 is introduced into evaporator 57 having evaporator coils 58. Warm spatial air flowing around evaporator coils 58 of evaporator 57 heats the liquid refrigerant to form refrigerant vapor. The refrigerant vapor exits evaporator 57 through process line 59 from which it enters absorber 56. In absorber 56, the refrigerant vapor is absorbed into the concentrated absorbent solution entering absorber 56 from process line 52, producing a dilute absorbent solution which exits absorber 56 through process line 60. The heat of absorption generated in absorber 56 is removed by coolant flowing through outdoor fan coil 61. The dilute absorbent solution from process line 60 flows first through low pressure pump 62 after which a portion of the dilute absorbent solution is introduced through process line 64 into low storage heat exchanger 54 and the remaining portion of dilute absorbent solution passes through high pressure pump 63, through process line 65 into high stage heat exchanger 53. The portion of dilute absorbent solution introduced into low stage heat exchanger 54 through process line 64 passes through low stage heat exchanger 54 in heat exchange relationship with low pressure concentrated absorbent solution passing through low stage heat exchanger 54, resulting in cooling of the concentrated absorbent solution and heating of the dilute absorbent solution. Similarly, the high pressure dilute absorbent solution introduced into high stage heat exchanger 53 passes through high stage heat exchanger 53 in heat exchanger relationship with high pressure concentrated absorbent solution from first effect generator 43, cooling the concentrated absorbent solution and heating the dilute absorbent solution. The heated dilute absorbent solution exits low stage heat exchanger 54 through process line 67 through which it flows into second effect generator 42, and the heated dilute absorbent solution in high stage heat exchanger 53 exits therefrom through process line 68 through which it flows into first effect generator 43, thereby completing the cycle.

In the heating mode of operation, outdoor fan coil 61 and absorber 56 are shunted out of the system and thus inoperative. Unlike the cooling mode of operation, double effect generator 41 produces a mixed liquid/vapor refrigerant which enters evaporator 57 through process line 45. In this case, refrigerant vapor is generated in second effect generator 42 and flows through process line 46 into process line 45, and refrigerant liquid is generated by first effect generator 43, flowing from first effect generator 43 through process line 47 into process line 45 where it mixes with the refrigerant vapor from second effect generator 42.

The mixed liquid/vapor refrigerant is introduced preferably into the top portion of evaporator coils 58 of evaporator 57. The vapor portion of the mixed liquid/vapor refrigerant is condensed in evaporator 57 which is functioning as a condenser and flows through evaporator coils 58 toward the bottom portion of evaporator 57. Concentrated absorbent solution flowing through process line 52 is directed by valve 55 through process line 66 into evaporator coils 58 disposed preferably in the bottom portion of evaporator 57 in which it mixes with condensed liquid refrigerant and forms a dilute absorbent solution. The dilute absorbent solution exits evaporator 57 through process line 59 and is returned through process line 60 to low pressure pump 62. Although FIG. 2 shows the dilute absorbent solution passing through absorber 56, in the heating mode of operation, absorber 56 is inoperative and, thus, serves merely as a conduit. As in the heating cycle of the single effect absorption cooling and heating system previously described, spatial air flowing through evaporator 57 around evaporator coils 58 picks up the heat of solution generated by the mixing of the condensed liquid refrigerant and the concentrated absorbent solution, thereby cooling the resulting dilute absorbent solution. This in turn increases the temperature of the spatial air and improves the thermal efficiency of the system.

As in the case of the single effect absorption cooling and heating system, the key to this embodiment of the invention is valve 55 which, in the heating mode of operation, directs concentrated absorbent solution directly into evaporator tubes 58 disposed preferably in the bottom portion of evaporator 57, and in the cooling mode of operation directs the concentrated absorbent solution into absorber 56 for absorption of the refrigerant vapor exiting evaporator 57 and flowing through process line 59 into absorber 56.

An apparatus for absorption cooling and heating in accordance with one embodiment of this invention comprises generator means for generating a concentrated absorbent solution, a condenser in communication with the generator means, an evaporator in communication with the condenser, an absorber in communication with the evaporator, a heat exchanger in communication with the absorber and the generator, means for pumping a dilute absorbent solution from the absorber to the generator, means for removing heat from the condenser and the absorber, and means for selectively directing the concentrated absorbent solution generated in the generator means between and input of the absorber and a lower portion of the evaporator.

Specifically, the apparatus for absorption cooling and heating having generator 10, condenser 11 in communication with generator 10, evaporator 13 in communication with condenser 11, absorber 16 in communication with evaporator 13, heat exchanger 17 in communication with absorber 16 and generator 10, and outdoor fan coil 15 in heat exchange contact with condenser 11 and absorber 16, in accordance with one embodiment of this invention, comprises the improvement of valve 18 having a concentrated absorbent solution input in communication with a concentrated absorbent solution output of heat exchanger 17 and having a first concentrated absorbent solution output in communication with absorber 16 and a second concentrated absorbent solution output in communication with evaporator 13 whereby the flow of concentrated absorbent solution through valve 18 can be directed either to absorber 16 or evaporator 13.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for heating in an absorption cooling and heating system comprising the steps of:
   generating a refrigerant vapor and a concentrated absorbent solution in a generator;
   condensing said refrigerant vapor in an evaporator forming a condensed refrigerant;
   mixing said condensed refrigerant with said concentrated absorbent solution in said evaporator producing a dilute absorbent solution;
   cooling said dilute absorbent solution; and
   circulating said cooled dilute absorbent solution from said evaporator into said generator.

2. A process in accordance with claim 1, wherein said refrigerant vapor is condensed in an upper portion of said evaporator and said condensed refrigerant is mixed with said concentrated absorbent solution in a lower portion of said evaporator.

3. A process in accordance with claim 1, wherein said generator is heated by natural gas.

4. A process in accordance with claim 1, wherein said concentrated absorbent solution is cooled and said cooled dilute absorbent solution is heated, said concentrated absorbent solution and said cooled dilute absorbent solution being in a heat exchange relationship with one another in a heat exchanger.

5. A process in accordance with claim 1, wherein said dilute absorbent solution is cooled by spatial air to be conditioned.

6. A process in accordance with claim 1, wherein a first portion of said cooled dilute absorbent solution is heated in a low stage heat exchanger in heat exchange relationship with a first portion of said concentrated absorbent solution and a second portion of said cooled dilute absorbent solution is heated in a high stage heat exchanger in heat exchange relationship with a second portion of said concentrated absorbent solution.

7. A process in accordance with claim 6, wherein said first portion of dilute absorbent solution is circulated to a second effect generator and said second portion of said dilute absorbent solution is circulated to a first effect generator.

8. A process in accordance with claim 7, wherein said first effect generator generates a liquid refrigerant and said liquid refrigerant is mixed with said refrigerant vapor from said second effect generator.

9. A process in accordance with claim 1, wherein said absorbent is lithium bromide and said refrigerant is water.

10. In an apparatus for absorption cooling and heating having generator means for generating a concentrated absorbent solution, a condenser in communication with said generator means, an evaporator in communication with said condenser, an absorber in communication with said evaporator, a heat exchanger in communication with said absorber and said generator means for pumping a dilute absorbent solution from said absorber to said generator and means for removing heat from said condenser and said absorber, the improvement comprising:
   means for selectively directing said concentrated absorbent solution generated in said generator means between an input of said absorber and a lower portion of said evaporator.

11. In an apparatus in accordance with claim 10, wherein said means for selectively directing said concentrated absorbent solution generated in said generator means between said input of said absorber and said lower portion of said evaporator comprises a valve disposed between said heat exchanger and said absorber, said valve in communication with said heat exchanger, said absorber and said evaporator.

12. In an apparatus in accordance with claim 10, wherein said generator means comprises at least one natural gas heated generator.

13. In an apparatus in accordance with claim 10, further comprising means for interrupting a hydronic cooling flow to said condenser and said absorber when said apparatus is in a heating mode.

14. In an apparatus in accordance with claim 10, wherein said generator means comprises at least one double effect generator.

* * * * *